United States Patent [19]

Cherpeck

[11] Patent Number: 5,192,335
[45] Date of Patent: Mar. 9, 1993

[54] FUEL ADDITIVE COMPOSITIONS CONTAINING POLY(OXYALKYLENE) AMINES AND POLYALKYL HYDROXYAROMATICS

[75] Inventor: Richard E. Cherpeck, Cotati, Calif.

[73] Assignee: Chevron Research and Technology Company, San Francisco, Calif.

[21] Appl. No.: 854,172

[22] Filed: Mar. 20, 1992

[51] Int. Cl.$^5$ ............................................... C10L 1/22
[52] U.S. Cl. .................................... 44/387; 44/442; 44/450
[58] Field of Search ....................... 44/387, 442, 450

[56] References Cited

U.S. PATENT DOCUMENTS

| | | | |
|---|---|---|---|
| 3,849,085 | 11/1974 | Kreuz et al. | 44/442 |
| 4,134,846 | 1/1979 | Machleder et al. | 252/51.5 A |
| 4,191,537 | 3/1980 | Lewis et al. | 44/387 |
| 4,231,756 | 11/1980 | King | 44/322 |
| 4,270,930 | 6/1981 | Campbell et al. | 44/387 |
| 4,778,481 | 10/1988 | Courtney | 44/387 |
| 4,881,945 | 11/1989 | Buckley, III | 44/387 |
| 4,933,485 | 6/1990 | Buckley, III | 44/387 |

Primary Examiner—Jacqueline Howard
Attorney, Agent, or Firm—S. Russell La Paglia; Claude J. Caroli

[57] ABSTRACT

A fuel additive composition comprising:
  (a) a poly(oxyalkylene) amine having at least one basic nitrogen atom and a sufficient number of oxyalkylene units to render the poly(oxyalkylene) amine soluble in hydrocarbons boiling in the gasoline or diesel range; and
  (b) a polyalkyl hydroxyaromatic compound or salt thereof wherein the polyalkyl group has sufficient molecular weight and carbon chain length to render the polyalkyl hydroxyaromatic compound soluble in hydrocarbons boiling in the gasoline or diesel range.

23 Claims, No Drawings

FUEL ADDITIVE COMPOSITIONS CONTAINING POLY(OXYALKYLENE) AMINES AND POLYALKYL HYDROXYAROMATICS

BACKGROUND OF THE INVENTION

This invention relates to a fuel additive composition. More particularly, this invention relates to a fuel additive composition containing a poly(oxyalkylene) amine and a polyalkyl hydroxyaromatic compound.

It is well known in the art that liquid hydrocarbon combustion fuels, such as fuel oils and gasolines, tend to exhibit certain deleterious characteristics, either after long periods of storage or under actual operational conditions. Gasolines, for example, in operational use tend to deposit sludge and varnish at various points in the power system, including the carburetor or injectors and the intake valves It is desirable, therefore, to find a means for improving liquid hydrocarbon fuels by lessening their tendency to leave such deposits.

U.S. Pat. No. 3,849,085 discloses a motor fuel composition comprising a mixture of hydrocarbon in the gasoline boiling range containing about 0.01 to 0.25 volume percent of a high molecular weight aliphatic hydrocarbon substituted phenol in which the aliphatic hydrocarbon radical has an average molecular weight in the range of about 500 to 3,500. This patent teaches that gasoline compositions containing a minor amount of an aliphatic hydrocarbon substituted phenol not only prevents or inhibits the formation of intake valve and port deposits in a gasoline engine but also enhances the performance of the fuel composition in engines designed to operate at higher operating temperatures with a minimum of decomposition and deposit formation in the manifold of the engine U.S. Pat. No. 134,846 discloses a fuel additive composition comprising a mixture of (I) the reaction product of an aliphatic hydrocarbon-substituted phenol, epichlorohydrin and a primary or secondary mono- or polyamine, and (2) a polyalkylene phenol This patent teaches that such compositions show excellent carburetor, induction system and combustion chamber detergency and, in addition, provide effective rust inhibition when used in hydrocarbon fuels at low concentrations.

SUMMARY OF THE INVENTION

The present invention provides a novel fuel additive composition comprising:
 (a) a poly(oxyalkylene) amine having at least one basic nitrogen atom and a sufficient number of oxyalkylene units to render the poly(oxyalkylene) amine soluble in hydrocarbons boiling in the gasoline or diesel range, and
 (b) a polyalkyl hydroxyaromatic compound or salt thereof wherein the polyalkyl group has sufficient molecular weight and carbon chain length to render the polyalkyl hydroxyaromatic compound soluble in hydrocarbons boiling in the gasoline or diesel range.

The present invention further provides a fuel composition comprising a major amount of hydrocarbons boiling in the gasoline or diesel range and an effective detergent amount of the novel fuel additive composition described above.

The present invention is also concerned with a fuel concentrate comprising an inert stable oleophilic organic solvent boiling in the range of from about 150° F. to 400° F. and from about 10 to 70 weight percent of the fuel additive composition of the instant invention.

Among other factors, the present invention is based on the surprising discovery that the unique combination of a poly(oxyalkylene) amine and a polyalkyl hydroxyaromatic compound provides unexpectedly superior deposit control performance when compared to each component individually.

DETAILED DESCRIPTION OF THE INVENTION

The poly(oxyalkylene) Amine

As noted above, the poly(oxyalkylene) amine component of the present fuel additive composition is a poly(oxyalkylene) amine having at least one basic nitrogen atom and a sufficient number of oxyalkylene units to render the poly(oxyalkylene) amine soluble in hydrocarbons boiling in the gasoline of diesel range. Preferably, such poly(oxyalkylene) amines will also be of sufficient molecular weight so as to be nonvolatile at normal engine intake valve operating temperatures, which are generally in the range of about 175° C. to 300° C.

Generally, the poly(oxyalkylene) amines suitable for use in the present invention will contain at least about 5 oxyalkylene units, preferably about 5 to 100, more preferably about 8 to 100, and even more preferably about 10 to 100. Especially preferred poly(oxyalkylene) amines will contain about 10 to 25 oxyalkylene units.

The molecular weight of the presently employed poly(oxyalkylene) amines will generally range from about 500 to about 10,000, preferably from about 500 to about 5,000.

Suitable poly(oxyalkylene) amine compounds include hydrocarbyl poly(oxyalkylene) polyamines as disclosed, for example, in U.S. Pat. No. 4,247,301 to Honnen, the disclosure of which is incorporated herein by reference. These compounds are hydrocarbyl poly(oxyalkylene) polyamines wherein the poly(oxyalkylene) moiety comprises at least one hydrocarbyl-terminated poly(oxyalkylene) chain of 2 to 5 carbon atom oxyalkylene units, and wherein the poly(oxyalkylene) chain is bonded through a terminal carbon atom to a nitrogen atom of a polyamine having from 2 to about 12 amine nitrogen atoms and from 2 to about 40 carbon atoms with a carbon-to-nitrogen ratio between about 1:1 and 10:1. The hydrocarbyl group on these hydrocarbyl poly(oxyalkylene) polyamines will contain from about 1 to 30 carbon atoms. These compounds generally have molecular weights in the range of about 500 to 10,000, preferably from about 500 to 5,000 and more preferably from about 800 to 5,000.

The above-described hydrocarbyl poly(oxyalkylene) polyamines are prepared by conventional procedures known in the art, as taught, for example, in U.S. Pat. No. 4,247,301.

Other poly(oxyalkylene) amines suitable for use in the present invention are the poly(oxyalkylene) polyamines wherein the poly(oxyalkylene) moiety is connected to the polyamine moiety through an oxyalkylene hydroxy-type linkage derived from an epihalohydrin, such as epichlorohydrin or epibromohydrin. This type of poly(oxyalkylene) amine having an epihalohydrin-derived linkage is described, for example, in U.S. Pat. No. 4,261,704, the disclosure of which is incorporated herein by reference.

Useful polyamides for preparing the epihalohydrin-derived poly(oxyalkylene) polyamines include, for example, alkylene polyamines, polyalkylene polyamines, cyclic amines, such as piperazines, and amino-substituted amines. The poly(oxyalkylene) polyamines having an epihalohydrin-derived linkage between the poly(oxyalkylene) and polyamine moieties are prepared using known procedures as taught, for example, in U.S. Pat. No. 4,261,704.

Another type or poly(oxyalkylene) amine useful in the present invention is a highly branched alkyl poly(oxyalkylene) monoamine as described, for example in published European Patent Application No. 0,448,365 A1, published Sep. 25, 1991, the disclosure of which is incorporated herein by reference. These highly branched alkyl poly(oxyalkylene) monoamines have the general formula:

wherein R is a highly branched alkyl group containing from 12 to 40 carbon atoms, preferably an alkyl group having 20 carbon atoms which is derived from a Guerbet condensation reaction, and x is a number up to 30, preferably 4 to 8. The preferred alkyl group is derived from a Guerbet alcohol containing 20 carbon atoms having the formula:

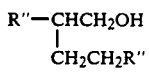

wherein R" is a hydrocarbyl chain.

The above highly branched alkyl poly(oxyalkylene) monoamines are prepared by using known methods as disclosed, for example, in European Patent Application No. 0,448,365 A1.

A preferred class of poly(oxyalkylene) amine suitable for use in the composition of the present invention is the hydrocarbyl-substituted poly(oxyalkylene) aminocarbamate disclosed, for example, in U.S. Pat. Nos. 4,288,612; 4,236,020; 4,160,648; 4,191,537; 4,270,930; 4,233,168; 4,197,409; 4,243,798 and 4,881,945, the disclosure of each of which are incorporated herein by reference. These hydrocarbyl poly(oxyalkylene) aminocarbamates will contain at least one basic nitrogen atom and have an average molecular weight of about 500 to 10,000, preferably about 500 to 5,000, and more preferably about 1,000 to 3,000. As discussed more fully below, these hydrocarbyl poly(oxyalkylene) aminocarbamates can be said to contain a poly(oxyalkylene) component, an amine component and a carbamate connecting group.

A. The poly(oxyalkylene) Component

The hydrocarbyl-terminated poly(oxyalkylene) polymers which are utilized in preparing the amino carbamates employed in the present invention are monohydroxy compounds, e.g., alcohols, often termed monohydroxy polyethers, or polyalkylene glycol monocarbyl ethers, or "capped" poly(oxyalkylene) glycols, and are to be distinguished from the poly(oxyalkylene) glycols (diols), or polyols, which are not hydrocarbyl-terminated, i.e., are not capped. The hydrocarbyl-terminated poly(oxyalkylene) alcohols are produced by the addition of lower alkylene oxides, such as oxirane, ethylene oxide, propylene oxide, butylene oxide, etc. to the hydroxy compound, ROH, under polymerization conditions, wherein R is the hydrocarbyl group which caps the poly(oxyalkylene) chain. In the poly(oxyalkylene) component employed in the present invention, the group R will generally contain from 1 to about 30 carbon atoms, preferably from 2 to about 20 carbon atoms and is preferably aliphatic or aromatic, i.e., an alkyl or alkyl phenyl wherein the alkyl is a straight or branched-chain of from 1 to about 24 carbon atoms. More preferably, R is alkylphenyl wherein the alkyl group is a branched-chain of 12 carbon atoms, derived from propylene tetramer, and commonly referred to as tetrapropenyl. The oxyalkylene units in the poly(oxyalkylene) components preferably contain from 2 to about 5 carbon atoms but one or more units of a larger carbon number may also be present. Generally, each poly(oxyalkylene) polymer contains at least about 5 oxyalkylene units, preferably about 5 to about 100 oxyalkylene units, more preferably about 8 to about 100 units, even more preferably about 10 to 100 units, and most preferably 10 to about 25 such units. The poly(oxyalkylene) component employed in the present invention is more fully described and exemplified in U.S. Pat. No. 4,191,537, the disclosure of which is incorporated herein by reference.

Although the hydrocarbyl group on the hydrocarbyl poly(oxyalkylene) component will preferably contain from 1 to about 30 carbon atoms, longer hydrocarbyl groups, particularly longer chain alkyl phenyl groups, may also be employed.

For example, alkylphenyl poly(oxyalkylene) aminocarbamates wherein the alkyl group contains at least 40 carbon atoms, as described in U.S. Pat. No. 4,881,945 to Buckley, are also contemplated for use in the present invention. The alkyl phenyl group on the aminocarbamates of U.S. Pat. No. 4,881,945 will preferably contain an alkyl group of 50 to 200 Carbon atoms, and more preferably, an alkyl group of 60 to 100 carbon atoms. The disclosure of U.S. Pat. No. 4,881,945 is incorporated herein by reference.

Also, contemplated for use in the present invention are alkylphenyl poly(oxypropylene) aminocarbamates wherein the alkyl group is a substantially straight-chain alkyl group of about 25 to 50 carbon atoms derived from an alpha olefin Oligomer of $C_8$ to $C_{20}$ alpha olefins, as described in PCT International Patent Application Publication No. WO 90/07564, published Jul. 12, 1990, the disclosure of which is incorporated herein by reference.

B. The Amine Component

The amine moiety of the hydrocarbyl-terminated poly(oxyalkylene) aminocarbamate is preferably derived from a polyamine having from 2 to about 12 amine nitrogen atoms and from 2 to about 40 carbon atoms. The polyamine is preferably reacted with a hydrocarbyl poly(oxyalkylene) chloroformate to produce the hydrocarbyl poly(oxyalkylene) aminocarbamate fuel additive finding use within the scope of the present invention. The chloroformate is itself derived from hydrocarbyl poly(oxyalkylene) alcohol by reaction with phosgene. The polyamine, encompassing diamines, provides the product poly(oxyalkylene) aminocarbamate with, on the average, at least about one basic nitrogen atom per carbamate molecule, i.e., a nitrogen atom titratable by strong acid. The polyamine preferably has a carbon-to-nitrogen ratio of from about 1:1 to about 10:1. The polyamine may be substituted with substituents selected from hydrogen, hydrocarbyl groups of from 1 to about 10 carbon atoms, acyl groups of from 2 to about 10 carbon atoms, and monoketone, monohydroxy, mononitro, monocyano, alkyl and alkoxy derivatives of hydrocarbyl groups of from 1 to 10 carbon atoms. It is preferred that at least one of the basic nitrogen atoms of the polyamine is a primary or secondary amino nitrogen. The polyamine component employed in the present invention has been described and exemplified more fully in U.S. Pat. No. 4,191,537.

Hydrocarbyl, as used in describing the hydrocarbyl poly(oxyalkylene) and amine components used in this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The more preferred polyamine finding use within the scope of the present invention is a polyalkylene polyamine, including alkylenediamine, and including substituted polyamines, e.g., alkyl and hydroxyalkyl-substituted polyalkylene polyamine. Preferably, the alkylene group contains from 2 to 6 carbon atoms, there being preferably from 2 to 3 carbon atoms between the nitrogen atoms. Examples of such polyamines include ethylenediamine, diethylene triamine, triethylene tetramine, di(trimethylene) triamine, dipropylene triamine, tetraethylene pentamine, etc. Among the polyalkylene polyamines, polyethylene polyamine and polypropylene polyamine containing 2-12 amine nitrogen atoms and 2-24 carbon atoms are especially preferred and in particular, the lower polyalkylene polyamines, e.g., ethylenediamine, diethylene triamine, propylene diamine, dipropylene triamine, etc., are most preferred.

C. The Aminocarbamate

The poly(oxyalkylene) aminocarbamate fuel additive used in compositions of the present invention is obtained by linking the amine component and the poly(oxyalkylene) component together through a carbamate linkage, i.e.,

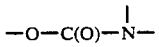

wherein the oxygen may be regarded as the terminal hydroxyl oxygen of the poly(oxyalkylene) alcohol component, and the carbonyl group —C(O)—, is preferably provided by a coupling agent, e.g., phosgene. In the preferred method of preparation, the hydrocarbyl poly(oxyalkylene) alcohol is reacted with phosgene to produce a chloroformate and the chloroformate is reacted with the polyamine. The carbamate linkages are formed as the poly(oxyalkylene) chains are bound to the nitrogen of the polyamine through the oxycarbonyl group of the chloroformate. Since there may be more than one nitrogen atom of the polyamine which is capable of reacting with the chloroformate, the aminocarbamate contains at least one hydrocarbyl poly(oxyalkylene) polymer chain bonded through an oxycarbonyl group to a nitrogen atom of the polyamine, but the carbonate may contain from 1 to 2 or more such chains. It is preferred that the hydrocarbyl poly(oxyalkylene) aminocarbamate product contains on the average, about 1 poly(oxyalkylene) chain per molecule (i.e., is a monocarbamate), although it is understood that this reaction route may lead to mixtures containing appreciable amounts of di or higher poly(oxyalkylene) chain substitution on a polyamine containing several reactive nitrogen atoms. A particularly preferred aminocarbamate is alkylphenyl poly(oxybutylene) aminocarbamate, wherein the amine moiety is derived from ethylene diamine or diethylene triamine. Synthetic methods to avoid higher degrees of substitution, methods of preparation, and other characteristics of the aminocarbamates used in the present invention are more fully described and exemplified in U.S. Pat. No. 4,191,537.

THE POLYALKYL HYDROXYAROMATIC COMPOUND

As noted above, the polyalkyl hydroxyaromatic component of the present fuel additive composition is a polyalkyl hydroxyaromatic compound or salt thereof wherein the polyalkyl group has sufficient molecular weight and carbon chain length to render the polyalkyl hydroxyaromatic compound soluble in hydrocarbons boiling in the gasoline or diesel range. As with the poly(oxyalkylene) amine component of the present invention, the polyalkyl hydroxyaromatic compound will preferably be of sufficient molecular weight so as to be nonvolatile at normal engine intake valve operating temperatures, generally in the range of about 175° C. to 300° C.

In general, the polyalkyl substituent on the polyalkyl hydroxyaromatic compound will have an average molecular weight in the range of about 400 to 5,000, preferably about 400 to 3,000, more preferably from about 600 to 2,000.

The polyalkyl-substituted hydroxyaromatic compounds finding use in this invention are derived from hydroxyaromatic hydrocarbons. Such hydroxyaromatic compounds include mononuclear monohydroxy and polyhydroxy aromatic hydrocarbons having 1 to 4, and preferably 1 to 3, hydroxy groups. Suitable hydroxyaromatic compounds include phenol, catechol, resorcinol, hydroquinone, pyrogallol, and the like The preferred hydroxyaromatic compound is phenol.

Suitable polyalkyl hydroxyaromatic compounds and their preparation are described, for example, in U.S. Pat. Nos. 3,849,085; 4,231,759 and 4,238,628, the disclosures of each of which are incorporated herein by reference.

The polyalkyl substituent on the polyalkyl hydroxyaromatic compounds employed in the invention may be generally derived from polyolefins which are polymers or copolymers of mono-olefins, particularly 1-monoolefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The preferred polyisobutenes used to prepare the presently employed polyalkyl hydroxyaromatic compounds are polyisobutenes which comprise at least about 20% of the more reactive methylvinylidene isomer, preferably at least 50% and more preferably at least 70%. Suitable polyisobutenes include those prepared using BF: catalysts. The preparation of such polyisobutenes in which the methylvinylidene isomer comprises a high percentage of the total composition is described in U.S. Pat. Nos. 4,152,499 and 4,605,808.

Examples of suitable polyisobutenes having a high alkylvinylidene content include Ultravis 30, a polyisobutene having a molecular weight of about 1300 and a methylvinylidene content of about 74%, available from British Petroleum.

Numerous methods are known for preparing the polyalkyl hydroxyaromatic compounds used in the present invention and any of these are considered suitable for producing the polyalkyl hydroxyaromatic component of the instant fuel additive composition. One such method involves the reaction of a phenol with an olefin polymer in the presence of an aluminum chloride-sulfuric acid catalyst, as described in U.S. Pat. No. 3,849,085. Similarly, U.S. Pat. No. 4,231,759 discloses that polyalkyl hydroxyaromatic compounds may be obtained by the alkylation of phenol with polypropylene, polybutylene and other polyalkylene compounds, in the presence of an alkylation catalyst, such as boron trifluoride.

One preferred method of preparing polyalkyl hydroxyaromatic compounds is disclosed in U.S. Pat. No. 4,238,628. This patent teaches a process for producing undegraded alkylated phenols by alkylating, at about 0° C. to 60° C., a complex comprising boron trifluoride and phenol with a propylene or higher olefin polymer having terminal ethylene units, wherein the molar ratio of complex to olefin polymer is about 1:1 to 3:1. Preferred olefin polymers include polybutene having terminal ethylene units.

Preferred polyalkyl hydroxyaromatic compounds finding use in the fuel additive composition of the present invention include polypropylene phenol, polyisobutylene phenol, and polyalkyl phenols derived from polyalphaolefins, particularly 1-decene oligomers.

Polyalkyl phenols, wherein the polyalkyl group is derived from polyalphaolefins, such as 1-octene and 1-decene oligomers, are described in PCT International Patent Application Publication No. WO 90/07564, published July 12, 1990, the disclosure of which is incorporated herein by reference. This publication teaches that such polyalkyl phenols may be prepared by reacting the appropriate polyalphaolefin with phenol in the presence of an alkylating catalyst at a temperature of from about 60° C to 200° C., either neat or in an inert solvent at atmospheric pressure A preferred alkylation catalyst for this reaction is a sulfonic acid catalyst, such as Amberlyst 15 ®, available from Rohm and Haas, Philadelphia, Pa.

Also contemplated for use in the present fuel additive composition are the salts of the polyalkyl hydroxyaromatic component, such as alkali metal, alkaline earth metal, ammonium, substituted ammonium and sulfonium salts. Preferred salts are the alkali metal salts of the polyalkyl hydroxyaromatic compound, particularly the sodium and potassium salts, and the substituted ammonium salts.

FUEL COMPOSITIONS

The fuel additive composition of the present invention will generally be employed in a hydrocarbon distillate fuel boiling in the gasoline or diesel range. The proper concentration of this additive composition necessary in order to achieve the desired detergency and dispersancy varies depending upon the type of fuel employed, the presence of other detergents, dispersants and other additives, etc. Generally, however, from 150 to 7500 weight ppm, preferably from 300 to 2500 ppm, of the present additive composition per part of base fuel is needed to achieve the best results.

In terms of individual components, fuel compositions containing the additive compositions of the invention will generally contain about 50 to 2500 ppm of the poly(oxyalkylene) amine and about 100 to 5000 ppm of the polyalkyl hydroxyaromatic compound. The ratio of polyalkyl hydroxyaromatic to poly(oxyalkylene) amine will generally range from about 0.5 to 10:1, and will preferably be about 2:1 or greater.

The deposit control additive may be formulated as a concentrate, using an inert stable oleophilic organic solvent boiling in the range of about 50° F. to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the present additive composition will be ordinarily at least 10% by weight and generally not exceed 70% by weight, preferably 10 to 50 weight percent and most preferably from 10 to 25 weight percent.

In gasoline fuels, other fuel additives may also be included such as antiknock agents, e.g., methylcyclopentadienyl manganese tricarbonyl, tetramethyl or tetraethyl lead, or other dispersants or detergents such as various substituted amines, etc. Also included may be lead scavengers such as aryl halides, e.g., dichlorobenzene or alkyl halides, e.g., ethylene dibromide. Additionally, antioxidants, metal deactivators, pour point depressants, corrosion inhibitors and demulsifiers may be present.

In diesel fuels, other well-known additives can be employed, such as pour point depressants, flow improvers, cetane improvers, and the like.

The following examples are presented to illustrate specific embodiments of this invention and are not to be construed in any way as limiting the scope of the invention.

EXAMPLES

Example 1

Preparation of Polyisobutyl Phenol

To a flask equipped with a magnetic stirrer, reflux condenser, thermometer, addition funnel and nitrogen inlet was added 203.2 grams of phenol. The phenol was warmed to 40° C. and the heat source was removed. Then, 73.5 milliliters of boron trifluoride etherate was added dropwise Ultravis 10 polyisobutene (molecular weight 950, 76% methylvinylidene, available from British Petroleum) was dissolved in 1,863 milliliters of hexane. The polyisobutene was added to the reaction at a rate to maintain the temperature between 22°-27° C. The reaction mixture was stirred for 16 hours at room temperature. Then, 400 milliliters of concentrated ammonium hydroxide was added followed by 2,000 milliliters of hexane. The reaction mixture was washed with water (3×2,000 milliliters), dried over magnesium sulfate, filtered and the solvents removed under vacuum to yield 1,056.5 grams of a crude reaction product. The crude reaction product was determined to contain 80% of the desired product by proton NMR and chromatography on silica gel eluting with hexane, followed by hexane: ethylacetate: ethanol (93:5:2).

Example 2

Thermogravimetric Analysis

The stability of certain fuel additives was measured by thermogravimetric analysis (TGA). The TGA procedure employed DuPont 951 TGA instrumentation coupled with a microcomputer for data analysis. Samples of the fuel additive (approximately 25 milligrams) were heated from 25° C. to 700° C. at 5° C. per minute under air flowing at 100 cubic centimeters per minute. The weight of the sample was monitored as a function of temperature. The thermal stability of various samples was compared at fifty percent weight loss. Sample 1 was a tetrapropenylphenyl poly(oxybutylene) ethylene diamine carbamate having a molecular Weight of about 1718, prepared in a manner similar to that described in U.S. Pat. No. 4,160,648 to Lewis, Examples 6-8 Sample 2 was a polyisobutyl phenol prepared from Ultravis 30 polyisobutene (molecular weight 1300, 74% methylvinylidene, available from British Petroleum) in a manner similar to Example 1 above.

The fifty percent weight loss temperature for Sample 1, tetrapropenylphenyl poly(oxybutylene) ethylenediamine carbamate, was 259° C. The fifty percent weight loss temperature for Sample 2, polyisobutyl phenol, was 347° C. A one-to-one mixture of the two components, Samples 1 and 2, was analyzed by TGA. The twenty-five percent weight loss temperature (50% weight loss of tetrapropenylphenyl poly(oxybutylene) ethylenediamine carbamate in the mixture) was 296° C. This demonstrates that the thermal stability of the tetrapropenylphenyl poly(oxybutylene) ethylenediamine carbamate is increased by the presence of the polyisobutyl phenol. This increase in thermal stability allows the tetrapropenylphenyl poly(oxybutylene) ethylenediamine carbamate to last longer at intake valve operating temperatures and allows for less deposits.

Example 3

Enqine Test

A laboratory engine test was used to evaluate both intake valve and combustion chamber deposit performance of the additive composition of the invention. The test engine is a 4.3 liter, TBI (throttle body injected), V6 engine manufactured by General Motors Corporation.

The major engine dimensions are listed below:

TABLE I

| Engine Dimensions | |
|---|---|
| Bore | 10.16 cm |
| Stroke | 8.84 cm |
| Displacement Volume | 4.3 liter |
| Compression Ratio | 9.3:1 |

The test procedure involves engine operation for 40 hours (24 hours a day) on a prescribed load and speed schedule representative of typical driving conditions. The cycle for engine operation during the test is as follows:

TABLE II

| | | Engine Driving Cycle | | |
|---|---|---|---|---|
| Step | Mode | Time in Mode [Sec]* | Dynamometer Load [kg] | Engine Speed [RPM] |
| 1 | Idle | 60 | 0 | 800 |
| 2 | City Cruise | 150 | 10 | 1,500 |
| 3 | Acceleration | 40 | 25 | 2,800 |
| 4 | Heavy HWY Cruise | 210 | 15 | 2,200 |
| 5 | Light HWY Cruise | 60 | 10 | 2,200 |
| 6 | Idle | 60 | 0 | 800 |
| 7 | City Cruise | 180 | 10 | 1,500 |
| 8 | Idle | 60 | 0 | 800 |

*All steps except step number 3, include a 15 second transition ramp. Step 3 include a 20 second transition ramp.

All of the test runs were made with the same base gasoline, which was representative of commercial unleaded fuel. The results are set forth in Table III.

TABLE III

| | Laboratory Engine Test Results | | | |
|---|---|---|---|---|
| Run | Additive | Concentration, ppm | Intake Valve Deposits, mg | Combustion Chamber Deposits, mg |
| 1 | — | — | 530 | 1,455 |
| 2 | Poly (oxyalkylene) Amine[a] | 200 | 471 | 1,692 |
| 3 | Polyalkyl Phenol[b] | 400 | 103 | 2,530 |
| 4 | Poly (oxyalkylene) Amine/Polyalkyl Phenol[c] | 200/400 | 18 | 1,825 |

[a]: tetrapropenylphenyl poly(oxybutylene) ethylene diamine carbamate
[b]: Ultravis 10 polyisobutyl (MW = 950) phenol
[c]: mixture of 200 ppm tetrapropenylphenyl poly(oxybutylene) ethylene diamine carbamate and 400 ppm Ultravis 10 polyisobutyl phenol The results shown in Table III demonstrate that the combination of polyisobutyl phenol and tetrapropenylphenyl poly(oxybutylene) ethylene diamine carbamate has a synergistic effect and gives significantly better intake valve deposit control than either component by itself. Also, the addition of tetrapropenylphenyl poly(oxybutylene) ethylene diamine carbamate to the polyisobutyl phenol reduces the combustion chamber deposit weight compared to the polyisobutyl phenol alone.

What is claimed is:

1. A fuel additive composition comprising:
    (a) a poly(oxyalkylene) amine having at least one basic nitrogen atom and a sufficient number of oxyalkylene units to render the poly(oxyalkylene) amine soluble in hydrocarbons boiling in the gasoline or diesel range; and
    (b) a polyalkyl hydroxyaromatic compound or salt thereof wherein the polyalkyl group has sufficient molecular weight and carbon chain length to render the polyalkyl hydroxyaromatic compound soluble in hydrocarbons boiling in the gasoline or diesel range.

2. The fuel additive composition according to claim 1, wherein the poly(oxyalkylene) amine of component (a) has a molecular weight in the range of about 500 to about 10,000.

3. The fuel additive composition according to claim 1, wherein the poly(oxyalkylene) amine of component (a) contains at least about 5 oxyalkylene units.

4. The fuel additive composition according to claim 1, wherein the poly(oxyalkylene) amine of component (a) is a hydrocarbyl poly(oxyalkylene) polyamine.

5. The fuel additive composition according to claim 1, wherein the poly(oxyalkylene) amine of component (a) is a poly(oxyalkylene) polyamine wherein the poly(oxyalkylene) moiety is connected to the polyamine moiety through an oxyalkylene hydroxy linkage derived from an epihalohydrin.

6. The fuel additive composition according to claim 1, wherein the poly(oxyalkylene) amine of component (a) is a branched alkyl poly(oxyalkylene) monoamine wherein the branched alkyl group is derived from the product of a Guerbet condensation reaction.

7. The fuel additive composition according to claim 1, wherein the poly(oxyalkylene) amine of component (a) is a hydrocarbyl poly(oxyalkylene) aminocarbamate.

8. The fuel additive composition according to claim 7, wherein the hydrocarbyl group in component (a) contains from 1 to about 30 carbon atoms.

9. The fuel additive composition according to claim 8, wherein the hydrocarbyl group in component (a) is an alkylphenyl group.

10. The fuel additive composition according to claim 9, wherein the alkyl moiety in the alkylphenyl group is tetrapropenyl.

11. The fuel additive composition according to claim 7, wherein the amine moiety of the aminocarbamate is derived from a polyamine having from 2 to 12 amine nitrogen atoms and from 2 to 40 carbon atoms.

12. The fuel additive composition according to claim Il, wherein the polyamine is a polyalkylene polyamine having 2 to 12 amino nitrogen atoms and 2 to 24 carbon atoms.

13. The fuel additive composition according to claim 12, wherein the polyalkylene polyamine is selected from the group consisting of ethylene diamine, propylene diamine, diethylene triamine and dipropylene triamine.

14. The fuel additive composition according to claim 7, wherein the poly(oxyalkylene) moiety of component (a) is derived from $C_2$ to $C_5$ oxyalkylene units.

15. The fuel additive composition according to claim 7, wherein the hydrocarbyl poly(oxyalkylene) aminocarbamate of component (a) is an alkylphenyl poly(oxybutylene) aminocarbamate, wherein the amine moiety is derived from ethylene diamine or diethylene triamine.

16. The fuel additive composition according to claim 1, wherein the polyalkyl hydroxyaromatic compound of component (b) has a polyalkyl group with an average molecular weight of about 400 to 5,000.

17. The fuel additive composition according to claim 1, wherein the hydroxyaromatic compound is phenol.

18. The fuel additive composition according to claim 1, wherein the polyalkyl substituent in component (b) is derived from polypropylene, polybutylene, or polyalphaolefin oligomers of 1-decene.

19. The fuel additive composition according to claim 18, wherein the polyalkyl substituent in component (b) is derived from polyisobutylene.

20. The fuel additive composition according to claim 19, wherein the polyisobutylene contains at least about 20% of a methylvinylidene isomer.

21. The fuel additive composition according to claim 1, wherein component (a) is an alkylphenyl poly(oxybutylene) aminocarbamate, wherein the amine moiety is derived from ethylene diamine or diethylene triamine, and component (b) is a polyisobutyl phenol.

22. A fuel composition comprising a major amount of hydrocarbons boiling in the gasoline or diesel range and an effective detergent amount of an additive composition comprising:
(a) a poly(oxyalkylene) amine having at least one basic nitrogen atom and a sufficient number of oxyalkylene units to render the poly(oxyalkylene) amine soluble in hydrocarbons boiling in the gasoline or diesel range; and
(b) a polyalkyl hydroxyaromatic compound or salt thereof wherein the polyalkyl group has sufficient molecular weight and carbon chain length to render the polyalkyl hydroxyaromatic compound soluble in hydrocarbons boiling in the gasoline or diesel range.

23. A fuel concentrate comprising an inert stable oleophilic organic solvent boiling in the range of from about 150° F. to 400° F. and from about 10 to 70 weight percent of an additive composition comprising:
(a) a poly(oxyalkylene) amine having at least one basic nitrogen atom and a sufficient number of oxyalkylene units to render the poly(oxyalkylene) amine soluble in hydrocarbons boiling in the gasoline or diesel range; and
(b) a polyalkyl hydroxyaromatic compound or salt thereof wherein the polyalkyl group has sufficient molecular weight and carbon chain length to render the polyalkyl hydroxyaromatic compound soluble in hydrocarbons boiling in the gasoline or diesel range.

* * * * *